United States Patent [19]
Shibahara et al.

[11] Patent Number: 4,542,204
[45] Date of Patent: Sep. 17, 1985

[54] METHOD FOR PARTICULATE PRODUCTION OF CONDENSATE OF ALDEHYDE COMPOUND AND PHENOL COMPOUND

[75] Inventors: Hiroshi Shibahara, Takasago; Hiromitsu Tachibana, Takasago, both of Japan

[73] Assignee: Kanegafuchi Kagaku Kogyo Kabushiki Kaisha, Osaka, Japan

[21] Appl. No.: 546,270

[22] Filed: Oct. 28, 1983

[30] Foreign Application Priority Data

Oct. 28, 1982 [JP] Japan ................................ 57-190586

[51] Int. Cl.$^4$ ............................ C08G 8/04; C08J 3/06; C08J 3/14; C08J 3/16
[52] U.S. Cl. ................................... 528/140; 528/137; 528/141; 528/155; 528/165; 528/139
[58] Field of Search ............... 528/155, 165, 140, 141, 528/137, 139

[56] References Cited

U.S. PATENT DOCUMENTS

| | | | |
|---|---|---|---|
| 1,743,680 | 1/1930 | Moss | 528/141 |
| 1,807,545 | 5/1931 | Ostersetzer | 528/137 X |
| 2,069,178 | 1/1937 | Dent | 528/165 X |
| 2,927,096 | 3/1960 | Soloway | 528/155 X |
| 3,083,170 | 3/1963 | Booty | 528/141 X |
| 3,743,619 | 7/1973 | Kooguchi et al. | 528/165 X |
| 4,039,525 | 8/1977 | McCarthy | 524/55 |
| 4,098,770 | 7/1978 | Berchem et al. | 528/140 X |
| 4,206,095 | 6/1980 | Wynstra et al. | 528/137 X |
| 4,317,901 | 3/1982 | Cosway | 528/139 |
| 4,366,303 | 12/1982 | Kopf | 528/165 X |
| 4,420,571 | 12/1983 | Blickensderfer et al. | 528/155 X |

Primary Examiner—Howard E. Schain
Attorney, Agent, or Firm—Armstrong, Nikaido, Marmelstein & Kubovcik

[57] ABSTRACT

A method for a condensate of an aldehyde compound and a phenol compound, said method comprising dispersing a viscous condensate obtained by the reaction of an aldehyde compound with a phenol compound into cold water or hot water by the aid of a dispersing agent, and then solidifying said condensate.

5 Claims, No Drawings

METHOD FOR PARTICULATE PRODUCTION OF CONDENSATE OF ALDEHYDE COMPOUND AND PHENOL COMPOUND

BACKGROUND OF THE INVENTION

1. Field of the Invention

The present invention relates to a method for producing a condensate of an aldehyde compound and a phenol compound in the form of fine particles. More particularly, it relates to a method for producing a solid phenolic resin in the form of fine particles which can be easily discharged from the reactor and readily mixed with a filler, coloring material, curing agent, etc. without crushing the solidified phenolic resin.

2. Description of the Prior Art

Heretofore, solid phenolic resins have been produced industrially by the cooling pan method. This method, however, has several drawbacks in workability and productivity, and it is not necessarily an effective industrial means. This method provides phenolic resin in the form of solid lump, which has to be crushed before mixing with a filler, coloring material, curing agent, etc.

In order to overcome the above-mentioned disadvantages, the present inventors carried out a series of researches, which led to the findings that solid phenolic resin in the form of fine particles can be obtained.

SUMMARY OF THE INVENTION

Accordingly, it is an object of this invention to provide a method for particulate production a condensate of an aldehyde compound and a phenol compound, said method comprising dispersing a viscous condensate obtained by the reaction of an aldehyde compound with a phenol compound into cold water or hot water by the aid of a dispersing agent, and then solidifying said condensate.

DETAILED DESCRIPTION OF THE INVENTION

The method of this invention can be applied to any known novolak type or resol type phenolic resins obtained by reacting a phenol compound with an aldehyde compound at a predetermined molar ratio in the presence of a catalyst. The phenol compound includes monohydroxy phenols such as phenol, naphthol, and bisphenol A; dihydroxy phenols such as resorcinol and xylenol; trihydroxy phenols such as pyrogallol and hydroxyhydroquinone; and alkyl-, carboxyl-, halogen-, and amine-derivatives thereof. They are used individually or in combination with one another. The aldehyde compound includes aliphatic aldehyde such as formaldehyde and acetaldehyde; and aromatic aldehyde such as benzaldehyde and furfural. The phenolic resin is obtained usually in the form of viscous liquid at high temperature.

According to the method of this invention, the viscous reaction product obtained after condensation reaction is dispersed with agitation into water by the aid of a dispersing agent, and the resulting slurry of solid phenolic resin in the form of fine particles is discharged from the reactor as much as required. The fine particles are filtered off, washed, and dried. Thus there is obtained a solid phenolic resin in the form of fine particles.

The viscous reaction product (phenolic resin) is turned into a solid phenolic resin in the form of fine particles in the following manners.

According to the first manner, cold water or hot water is added to the reactor in which the reaction has finished. Then a polymeric dispersing agent and/or an inorganic dispersing agent is added, with thorough stirring, so that the viscous reaction product is dispersed into water. The reaction product is cooled below its melting point, or unreacted products which lower the melting point of the reaction product are removed, whereby a slurry of solid phenolic resin in the form of fine particles is obtained. The slurry is discharged from the reactor as much as required. The solid particles are filtered off, washed, and dried. Thus there is obtained an easy-to-handle solid phenolic resin in the form of fine particles.

The reaction product is cooled below its melting point by introducing ice or cold water into the reactor or by passing cold water through the reactor jacket.

The unreacted products can be removed by steam distillation under normal pressure or reduced pressure.

According to the second manner, the viscous reaction product is poured into cold water or hot water containing a polymeric dispersing agent and/or an inorganic dispersing agent, with thorough stirring so that the reaction product is dispersed into water. The dispersed reaction product is solidified in the above-mentioned first manner. Thus there is obtained an easy-to-handle solid phenolic resin in the form of fine particles.

The polymeric dispersing agent used in this invention includes, for example, partially saponified product of polyvinyl acetate, methyl cellulose, hydroxyethyl cellulose, hydroxymethyl cellulose, carboxymethyl cellulose, polyvinyl pyrrolidone, gelatin, copolymer of vinyl methyl ether and maleic anhydride, and block copolymer of ethylene oxide and propylene oxide. The inorganic dispersing agent used in this invention includes, for example, calcium tertiary phosphate, calcium secondary phosphate, calcium carbonate, aluminum hydroxide, barium sulfate, talc, alumina, and titanium oxide.

Some of the above-mentioned inorganic dispersing agents dissolve and lose their ability when the pH is low. In such a case, the pH should be adjusted. For instance, the pH should be higher than 4.0 for calcium tertiary phosphate. Incidentally, the calcium tertiary phosphate that can be used in this invention is not only commercial one but also one which is synthesized by neutralization reaction of phosphoric acid with slaked lime or by double decomposition reaction of alkali phosphate and calcium chloride.

These polymeric dispersing agents can be used individually or in combination with one another, and these inorganic dispersing agents can be used individually or in combination with one another. For the stable production of a solid phenolic resin in the form of fine paticles, it is desirable to use the polymeric dispersing agent and the inorganic dispersing agent in combination with each other.

The polymeric dispersing agent should be used in an amount of 0.01 to 2% based on the weight of the phenolic resin; and the inorganic dispersing agent should be used in an amount of 0.1 to 10% based on the weight of the phenolic resin. If necessary, known anionic, cationic, or nonionic emulsifiers may be added.

The method of this invention may be advantageously applied if phosphoric acid is used as a catalyst, in the case where the phenolic resin is synthesized in the presence of an acid catalyst. After reaction, the phosphoric acid can be converted into calcium tertiary phosphate or calcium secondary phosphate, which works as the inorganic dispersing agent, when calcium hydroxide is introduced into the reactor.

The phenolic resin produced according to the method of this invention can be easily discharged from the reactor and can be handled conveniently in the molding process.

The invention is described in more detail with reference to the following nonlimitative examples.

EXAMPLE 1

Into a 2-liter reactor equipped with a stirrer and reflux condenser were charged 94 g (1 mol) of phenol, 318 g (3 mol) of benzaldehyde, and 39.2 g (0.3 mol) of 75% phosphoric acid. Reaction was carried out with stirring under reflux for 6 hours. Then, 1000 ml of hot water (80° C.) was added with thorough stirring. 0.3 g of hydroxyethyl cellulose and 289 g of 10% $Ca(OH)_2$ slurry were added to disperse the viscous reaction product into water. Steam was blown into the reactor to remove unreacted benzaldehyde. Thus there was obtained a slurry containing fine particles of solid phenolic resin. This slurry was filtered by a 200-mesh wire screen to separate the fine particles of phenolic resin from the inorganic dispersing agent. The phenolic resin fine particles were finally dried, and there was obtained a solid phenolic resin in the form of fine particles.

EXAMPLE 2

There was obtained a solid phenolic resin in the form of fine particles in the same manner as in Example 1 except that the phenol was replaced by pyrogallol.

EXAMPLE 3

Into a 2-liter reactor equipped with a stirrer and reflux condenser were charged 126 g (1 mol) of pyrogallol, 318 g (3 mol) of benzaldehyde, and 1 ml of 35% hydrochloric acid. Reaction was carried out with stirring under reflux for 6 hours. 1000 ml of 80° C. hot water was added to the reaction system. The pH was adjusted to 6.5. 0.3 g of hydroxyethyl cellulose and 30 g of calcium tertiary phosphate were added to disperse the viscous reaction product. Steam was blown into the reactor to remove unreacted benzaldehyde. There was obtained a slurry containing fine particles of solid phenolic resin. This slurry was treated in the same manner as in Example 1. There was obtained a solid phenolic resin in the form of fine particles.

EXAMPLE 4

Into a 1-liter reactor equipped with a stirrer and reflux condenser were charged 126 g (1 mol) of pyrogallol, 318 g (3 mol) of benzaldehyde, and 1 ml of 35% hydrochloric acid. Reaction was carried out with stirring under reflux for 6 hours. The reaction product was poured into 1000 ml of 80° C. hot water containing 0.3 g of hydroxyethyl cellulose and 35 g of calcium tertiary phosphate, held in a 2-liter container, so that the reaction product was dispersed. Steam was blown into the slurry to remove unreacted benzaldehyde. Thus there was obtained a slurry containing fine particles of solid phenolic resin. This slurry was treated in the same manner as in Example 1. There was obtained a solid phenolic resin in the form of fine particles.

EXAMPLE 5

There was obtained a solid phenolic resin in the form of fine particles in the same manner as in Example 1 except that the 10% $Ca(OH)_2$ slurry was replaced by 24 g (0.6 mol) of NaOH and 66.6 g (0.6 mol) of $CaCl_2$.

EXAMPLE 6

There was obtained a solid phenolic resin in the form of fine particles in the same manner as in Example 1 except that the hydroxyethyl cellulose was not added.

EXAMPLE 7

There was obtained a solid phenolic resin in the form of fine particles in the same manner as in Example 1 except that the $Ca(OH)_2$ was not added.

COMPARATIVE EXAMPLE 1

Example 1 was repeated except that the hydroxyethyl cellulose and $Ca(OH)_2$ were not added. A phenolic resin was obtained in the form of solid lump.

The particle size distribution was measured for the phenolic resins obtained in Examples and Comparative Example. The results are shown in Table 1.

It is to be noted from Table 1 that according to the method of this invention phenolic resins in the form of particles can be obtained. Moreover, phenolic resins in the form of fine particles can be obtained when a polymeric dispersing agent and an inorganic dispersing agent are used in combination with each other.

TABLE 1

| | Particle size distribution (mesh) | | | | | | |
|---|---|---|---|---|---|---|---|
| | 42 | 60 | 80 | 100 | 120 | 145 | 200 on |
| Example 1 | 0 | 0 | 1 | 14 | 38 | 32 | 15 |
| Example 2 | 0 | 0 | 4 | 17 | 24 | 35 | 20 |
| Example 3 | 0 | 0 | 3 | 16 | 40 | 35 | 6 |
| Example 4 | 0 | 0 | 2 | 15 | 35 | 38 | 10 |
| Example 5 | 0 | 0 | 0 | 7 | 35 | 41 | 17 |
| Example 6 | 0 | 2 | 36 | 45 | 15 | 2 | 0 |
| Example 7 | 8 | 42 | 36 | 10 | 4 | 0 | 0 |
| Comparative Example 1 | Not dispersed but solidified in lump. | | | | | | |

What is claimed is:

1. A method for production of a particulate condensate of an aldehyde compound and a phenol compound, said method comprising dispersing a viscous condensate obtained by the reaction of an aldehyde compound with a phenol compound into cold water or hot water by the aid of an inorganic dispersing agent which is insoluble in the water in which said viscous condensate is dispersed and then solidifying said condensate, wherein the inorganic dispersing agent is used in an amount of 0.1 for 10% based on the weight of the phenolic resin.

2. A method for production of claim 1, wherein the solidification is accomplished by cooling to a temperature lower than the melting point of said condensate.

3. A method for production of claim 1, wherein the inorganic dispersing agent is selected from the group consisting of calcium tertiary phosphate, calcium secondary phosphate, calcium carbonate, aluminum hydroxide, barium sulfate, talc, alumina and titanium oxide.

4. A method for production of claim 1, wherein the condensate of aldehyde compound and phenol compound is composed of benzaldehyde and pyrogallol.

5. A method for production of claim 3, wherein the inorganic dispersing agent is calcium tertiary phosphate or calcium secondary phosphate.

* * * * *